(No Model.)

A. R. BOYNTON.
BUTTON.

No. 315,894. Patented Apr. 14, 1885.

WITNESSES

Alonzo R. Boynton
INVENTOR
Louis Bagger & Co.,
By his Attorneys

UNITED STATES PATENT OFFICE.

ALONZO R. BOYNTON, OF AUBURN, NEW YORK, ASSIGNOR OF ONE-HALF TO JOSEPH STOMPE, OF SAME PLACE.

BUTTON.

SPECIFICATION forming part of Letters Patent No. 315,894, dated April 14, 1885.

Application filed January 15, 1885. (No model.)

*To all whom it may concern:*

Be it known that I, A. R. BOYNTON, of Auburn, in the county of Cayuga and State of New York, have invented certain new and useful Improvements in Buttons; and I do hereby declare that the following is a full, clear, and exact description of the invention, which will enable others skilled in the art to which it appertains to make and use the same, reference being had to the accompanying drawings, which form a part of this specification, and in which—

Figure 1:
Figure 2:
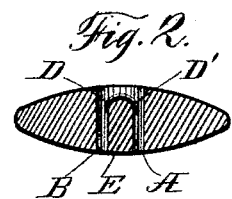
Figure 3:
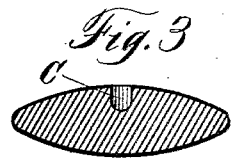
Figure 4:
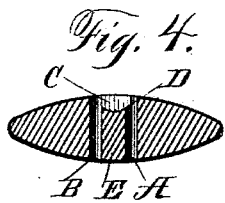
Figure 5:

Figure 1 is a perspective view of a button made by my improved method. Fig. 2 is a sectional view of the same. Fig. 3 is a similar view taken at right angles to the same. Fig. 4 is a sectional view of a button made by the old method, and Fig. 5 is a section at right angles to Fig. 4.

Similar letters of reference indicate corresponding parts in all the figures.

My invention has relation to an improved method of manufacturing buttons of that class which are first cut or turned out of a solid substance and afterward have the holes drilled in them; and it consists in the improved method of drilling the holes and at the same time cutting the recess in which the thread rests, as hereinafter more fully described and claimed.

In the most generally used method of manufacturing buttons out of a solid substance the holes were first drilled, whereupon the recess between the holes, in which recess the thread rests, was cut by means of a small circular saw or cutter, which would make the recess concave and form sharp edges at the ends of the recess, which would cut the thread, or the recess would be cut by a suitable tool, which would scoop out the material between the holes and round the ends of the recess; but both of these methods require two sets of tools and two manipulations of the button, which I desire to avoid.

A button manufactured by the first-mentioned method is shown in the sectional views, Figs. 4 and 5, in which A and B are the holes which are drilled in the button. C is the recess cut by the circular saw or cutter, so as to form the edges D D at the ends of the bridge E, which separates the holes. By my method one hole, A, is first drilled, whereupon the button is moved transversely to the drill without removing the button entirely from the drill, or vice versa, the drill thus plowing the recess C and forming its ends D' rounded, by gradually removing and inserting the drill at the said ends while the lateral or traversing motion takes place, whereupon the drill is allowed to pass through the button, making the hole B. This method, it will be seen, dispenses with the saw or cutter, and bores the holes and cuts the recess at one operation, thus saving time and labor, and produces a button which will not cut the thread. The button produced by this method avoids the trouble caused by the corners of the recess and holes cutting the thread, the said corners being rounded.

I am aware that buttons have been made with the corners of the thread-recess at the thread-perforations rounded, and I do not wish to make broad claims for the method of cutting said corners rounded; but

I claim—

The herein-described method of manufacturing buttons, consisting in first drilling one thread-perforation, thereupon partly withdrawing the drill and button from each other, at the same time traversing one relatively to the other, continuing this traversing motion, so as to plow a recess across the button, gradually approaching the drill and button toward each other during the last portion of the traversing motion, and lastly drilling the other hole, as and for the purpose shown and set forth.

In testimony that I claim the foregoing as my own I have hereunto affixed my signature in presence of two witnesses.

ALONZO R. BOYNTON.

Witnesses:
P. FRED DEERING,
H. HOMER POTTER.